Jan. 3, 1933.  C. S. BROWN  1,892,865
MOTOR IMPLEMENT
Filed Oct. 28, 1930  3 Sheets-Sheet 2

INVENTOR.
Charles S. Brown
By Rodell & Thompson
ATTORNEYS.

Jan. 3, 1933.  C. S. BROWN  1,892,865
MOTOR IMPLEMENT
Filed Oct. 28, 1930   3 Sheets-Sheet 3

INVENTOR.
Charles S. Brown
BY
Bodell & Thompson
ATTORNEYS.

Patented Jan. 3, 1933

1,892,865

UNITED STATES PATENT OFFICE

CHARLES S. BROWN, OF SYRACUSE, NEW YORK

MOTOR IMPLEMENT

Application filed October 29, 1930. Serial No. 491,804.

This invention relates to motor implements, as for instance, motor mowers, and has for its object, a simple, rigid, relative arrangement of the frame, engine, axle, jack shaft, propeller shaft, implement shaft, drive wheels and steering wheel, and the various gearings, and other parts, whereby the machine has a low center of gravity, the power is transmitted through shafts having minimum inclinations, and in which the driving strains are borne for the most part by one of the ground wheels, and a minimum of torque is transferred through long shafts, keys etc., and particularly when the differential gearing is working when turning a corner.

The invention consists in the novel features and in the combinations and constructions hereinafter set forth and claimed.

In describing this invention, reference is had to the accompanying drawings, in which like characters designate corresponding parts in all the views.

Figure 1:
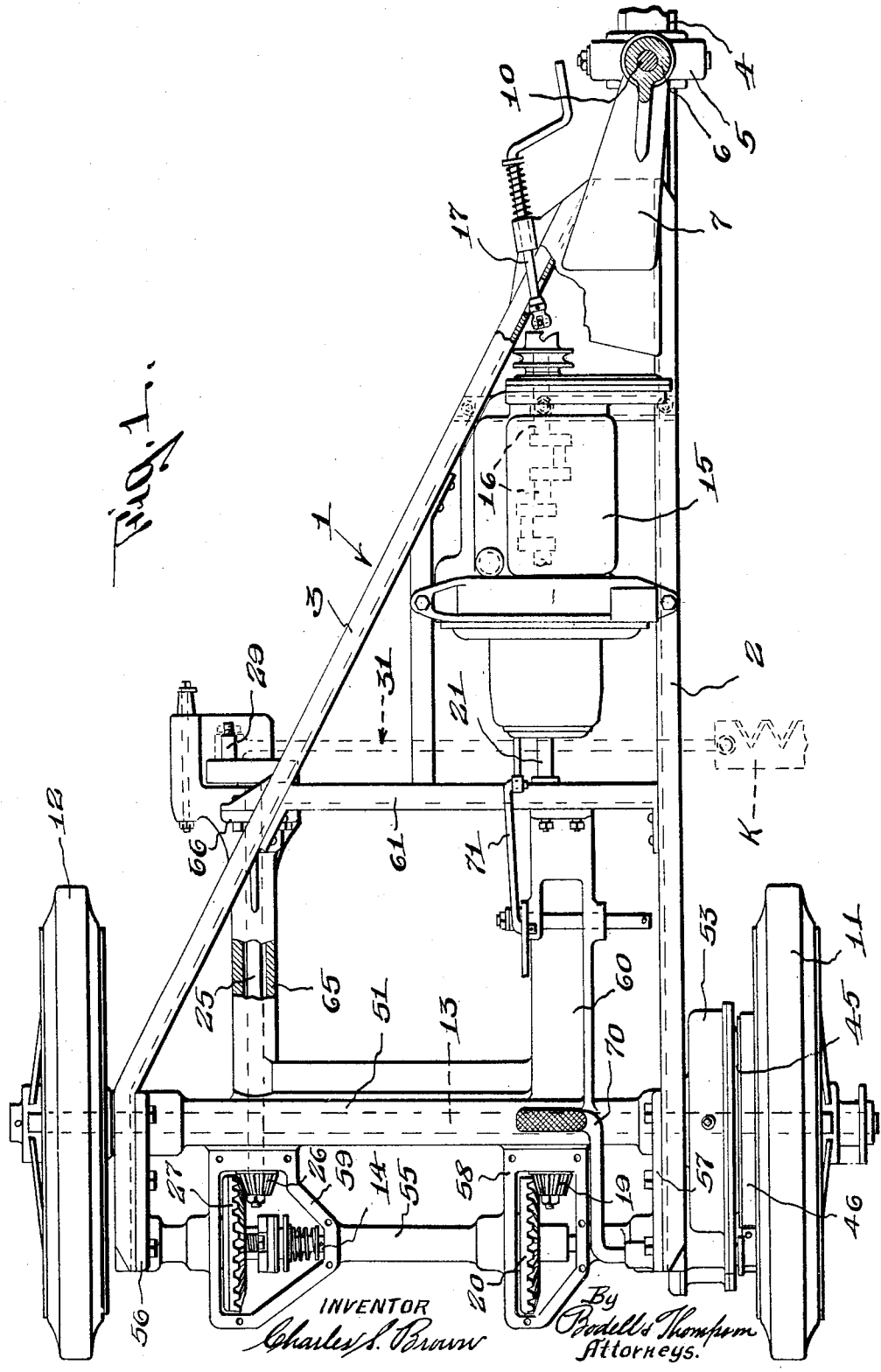
Figure 1 is a plan view, partly broken away, and parts being omitted, of a machine embodying my invention.
Figure 2:
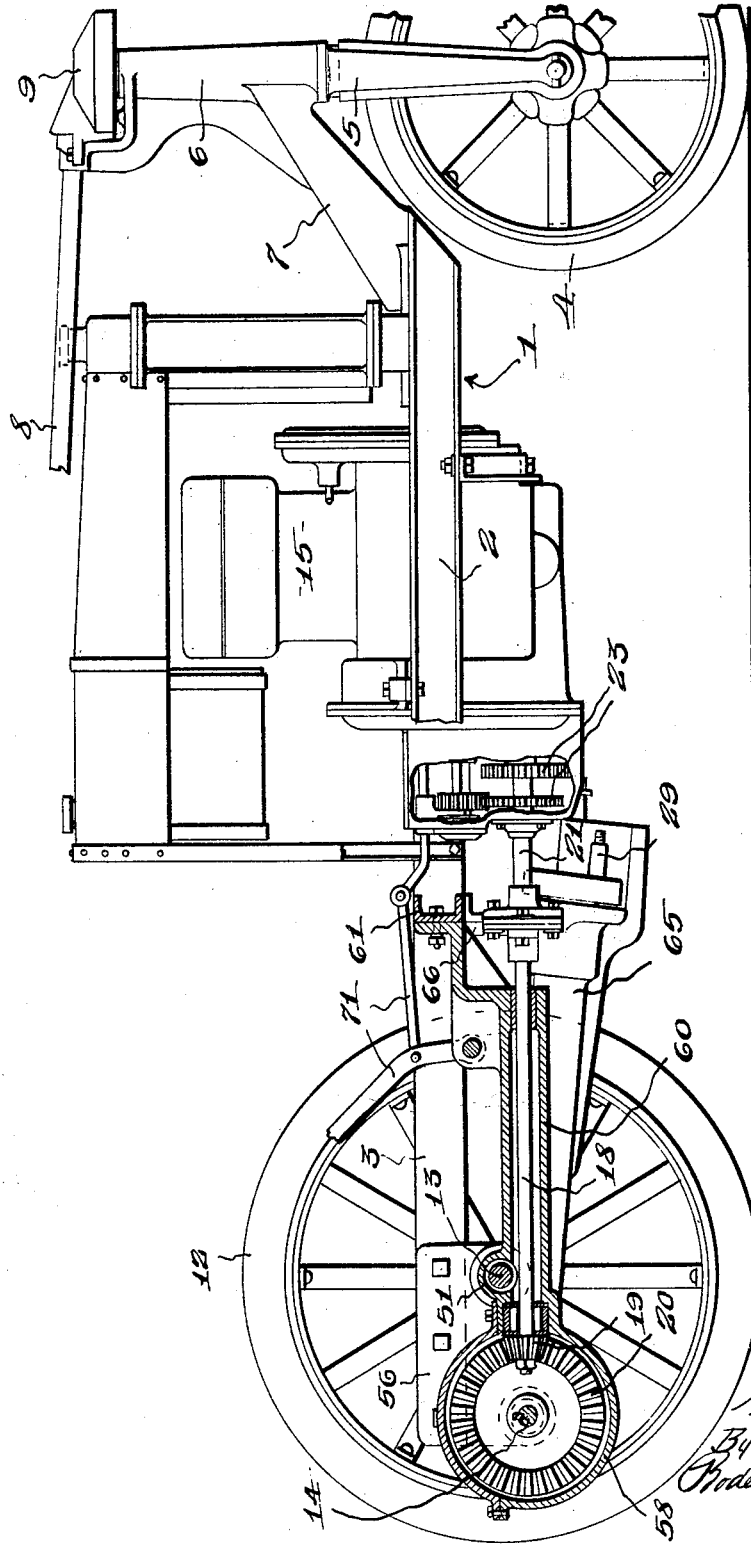
Figure 2 is a fragmentary, side elevation, partly in section.
Figure 3:
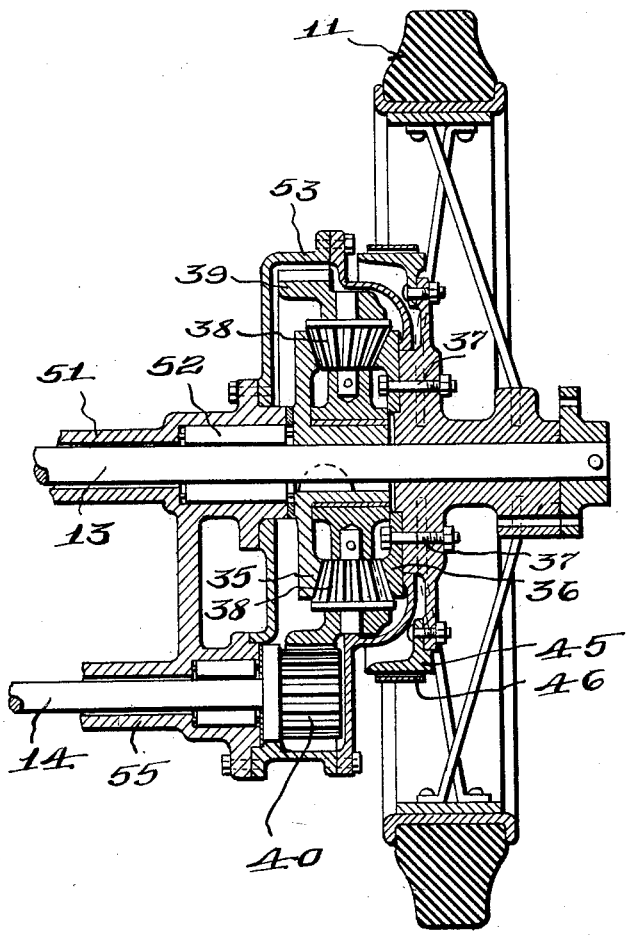
Figure 3 is an enlarged, transverse, fragmentary, sectional view through differential gearing and contiguous parts.

This machine comprises generally, a frame, front and rear supporting wheels, an axle extending transversely of the rear end of the frame on which the rear wheels are mounted, the front wheel being a steering wheel and turnable into different angles, an engine mounted on the forward part of the frame near one side, as the knife side, and arranged with its shaft extending lengthwise of the frame, a propeller shaft extending lengthwise of the frame and connected at its front end to the engine shaft, through the counter shaft of the transmission gearing, and its rear end extending under the axle, a jack shaft extending transversely of the frame in the rear of the axle, an implement shaft extending lengthwise of the frame and located near the opposite side of the frame to that on which the propeller shaft is located. the implement shaft extending under the rear axle, and inclining downwardly and forwardly, gearing between the propeller shaft and the jack shaft, and between the jack shaft and the implement shaft, and motion transmitting means between the front end of the implement shaft and the movable element, or knife of an implement.

The machine further includes transverse and lengthwise braces extending along the various shafts, the lengthwise braces being joined at their rear ends to the transverse brace along the axle, and also, brace means connecting the transverse shafts.

The machine further includes differential gearing located near the rear wheel which stops, or travels slower when turning a corner, or which has less movement than the other rear wheel when a corner is being turned, so that when a corner is being turned, the greater part of the torque is borne by the solid construction between the side gear of the differential and the retarded wheel to which it is fixed, and the less by far, part of the torque is transmitted through shafts, keys etc. It will be understood that in implements as mowers, the corner is turned around the standing crop. That is, going around a field, the corners are turned to the right, if the mower knife is on the right side of the machine, and to the left, if the knife is on the left side of the machine, and in this machine, the differential gear is located so that the driving strain and the strain of the differential action will be borne for the most part, by the solid construction of the side gear of the differential and the rear wheel to which it is attached on the knife side of the frame, that is, in the illustrated embodiment, the right hand wheel, and when turning a corner, the outside, or left hand wheel is required to carry very little torque. The frame is preferably in the general form of a right triangle.

This application is a continuation in part of application Ser. No. 439,183, filed March 26, 1930 and application Ser. No. 457,616, filed May 30, 1930.

1 designates the frame, 2 and 3 the side members, or sills, these being generally formed of angle iron, the member 2 forming the altitude of the triangular formation, and the member 3 the hypotenuse.

4 is the front steering wheel mounted in the fork 5 having the spindle 10 journalled in the bearing 6 supported by a bracket 7 at the front end of the frame members 2, 3, and at the front or apex end of the frame, this wheel 4 being operable into different angles by any well known means, as a steering shaft 8 extending rearwardly, and having a wheel, not shown, at its rear end within reach of the driver's seat, not shown, mounted on the rear portion of the frame.

The shaft 8 is connected to the spindle of the fork 5, through suitable gearing located in a casing 9.

11 and 12 designate respectively, the rear wheels, which are located at the base of the triangle, the wheel 11 being located on the altitude side of the triangle, that is, adjacent the frame member 2, and in the rear of, and nearly in line with, the front wheel 4. The wheel 12 is mounted upon the hypotenuse side of the triangle. An axle shaft 13 extends transversely of the triangle or frame at the rear end thereof, and the wheels 11 and 12 are mounted upon the ends of this axle, the wheel 12 being keyed to the axle, and the wheel 11 being loosely mounted on the axle, the two wheels being connected together by a differential gearing to be hereinafter described.

14 designates the jack shaft extending transversely of the frame in the rear of the axle 13, and connected to the wheels 11, 12, through suitable motion transmitting means including the differential gearing.

15 is an engine, as an internal combustion engine, mounted toward the front of the machine and having its shaft 16 extending lengthwise of the frame parallel to the altitude side member 2. The front end of this shaft 16 is located adjacent the hypotenuse side 3 near the apex, where it is accessible to a starting crank 17.

18 designates a propeller shaft extending lengthwise of the frame near the altitude side thereof, this shaft extending rearwardly in approximately a horizontal line under the axle 13 to the rear thereof. It is connected at its rear end to the jack shaft 14, through suitable gearing, as a beveled driving pinion 19 and gear 20 mounted respectively on the propeller shaft and the jack shaft.

The propeller shaft is connected at its front end to the engine shaft, through transmission gearing so arranged that the propeller shaft is at a lower level than the engine shaft, this arrangement permitting the engine to be mounted high enough to have ground clearance, and the propeller shaft to be mounted low enough to pass under the rear axle 13, and with a minimum angle in elevation between the implement shaft and the ground.

The propeller shaft is here shown as connected at its front end to the driven shaft 21 of a transmission gearing, and this shaft 21 is located below the level of the engine shaft and is connected thereto through suitable change speed gearing 23. Ordinarily, the driven shaft of a transmission gearing with internal combustion engines is in line with the drive shaft of the gearing, and the latter is in line with the engine shaft and hence, the propeller shaft extends from the same level, as the rear end of the engine shaft. By taking the power off from the jack shaft 21 of the gearing, that is, by connecting the propeller shaft to the jack shaft, which is of a lower level than the engine shaft, the propeller shaft can be arranged at a lower level, so as to extend under the rear axle 13, which construction allows a very little angle between the implement shaft and the ground.

25 designates an implement shaft, this extending lengthwise of the frame on the hypotenuse side 3 of the frame and parallel to the propeller shaft. The implement shaft 25 extends under the rear axle, and inclines downwardly and forwardly with its front end connected to the knife K extending laterally from the frame on the altitude side thereof. The shaft 25 extends under and to the rear of the rear axle, and is connected to the jack shaft through beveled gears 26 and 27 mounted respectively on the shaft 25, and the jack shaft 14.

The gear 27 is mounted to slip under certain conditions, and also is disconnectible at the will of the operator from the jack shaft 14 in any suitable manner.

The knife K coacts with the usual finger bar, which is connected to the frame in any well known manner. The knife is connected to a crank pin 29 at the front end of the shaft 25 by a pitman 31. The jack shaft 14 is connected to the rear wheel 11 on the knife side of the frame through the differential gearing, which differential gearing is mounted on, or adjacent the wheel 11. It includes a side gear 35 keyed to the axle 13, a side gear 36 secured or bolted at 37 to the body or hub of the wheel 11, and compensating pinions 38 mounted in a carrier or ring gear 39 which meshes with a gear 40 on one end of the jack shaft 14. Also, a brake drum 45 is mounted on the wheel 11 adjacent the differential with which coacts a brake band 46 operable at the will of the operator. The differential gear and the brake are thus located near and carried by the wheel 11, which is the inside or retarded wheel when a corner is being turned, so that the strain of the braking or retarding movement is borne directly by the solid construction of the differential side gear and wheel 11, and not transferred through long shafts, keys etc.

Owing to the number of gear reductions which this shaft arrangement allows, smaller gears and larger pinions can be used, and also the knife drive shaft can be arranged at a small inclined angle not possible in other arrangements of the shafts, and also, the frame and shaft can be mounted low, or with low center of gravity with ample clearance.

The frame is provided with lengthwise and transverse braces extending along the various shafts, and these brace members are preferably tubular.

51 designates a tubular brace extending between the rear end of the side members of the frame, and enclosing the axle 13, and having bearings for the axle shaft, one bearing 52 near the side gear 35 of the differential gear and adjacent the altitude frame member 2. The differential gear housing 53 and the brake are located outside of the side frame member 2.

55 designates a tubular brace surrounding the jack shaft 14, and secured at one end to a brace plate 56 to which side member 3 is fastened, and at its other end to a similar brace plate 57 to which side member 2 is fastended. The braces 56 and 57 are formed integral with the tubular braces 51 and 55. The braces 56 and 57 secured or bolted to the rear ends of the side frame members 2, 3. Brace members also connect the transverse braces 51 and 55, these being designated respectively 58 and 59, and serving as housings for the gears 19, 20 and 26, 27.

60 designates a tubular brace enclosing the propeller shaft 18, this being connected to, or formed integral with the brace 51, and as being supported at its front end to the frame by suitable means, as a transverse brace 61 between the side members 2, 3 of the frame, just in the rear of the engine 15.

65 is a tubular brace enclosing a knife shaft 25, this being connected at its rear end, or formed integral with the tubular brace 51 for the axle 13. This brace 65 inclines downwardly and forwardly to conform to the inclination of the knife shaft 25, and is suspended at its front end from the frame, or the hypotenuse frame member 3 thereof, and the brace 61, by a bracket 66.

70 is a foot lever for operating the brake band in any suitable manner. Also, there are suitable control means for the transmission gearing, designated generally 71. The differential gearing is described in my pending application, Sr. No. 457,616, filed May 30, 1930.

The machine here illustrated is designed to turn a right hand corner, although obviously it can be steered and it will turn a left hand corner, if the steering wheel 4 is turned to the proper angle. The knife K is arranged on the altitude side of the triangle between the front steering wheel 4, and the rear driving wheel 11 nearly in line therewith. In turning a corner to the right, the wheel 11 tends to stand still, and the wheel 12 is actuated faster through the differential gearing. Also, the long axle shaft 13 bears only the torque required to drive the wheel 12, or the wheel carrying little of the load, or the wheel on the light side of the machine, since there is less weight on the outside wheel 12. Thus, the axle shaft 13, the keys, or other means connecting it and the wheel 12, and connecting said axle and the side gear of the differential, are required to bear comparatively light strains, while the heavy strain is carried by the direct or riveted construction between the differential side gear and the wheel 11.

Owing to the number and location of gear reductions and the consequent shaft arrangement, smaller and stronger gears can be used, and the knife shaft is arranged at a comparatively small angle with the ground.

What I claim is:

1. In a motor implement, the combination of a frame, front and rear supporting wheels, an axle supported by and extending transversely of the frame near the rear end thereof, and on which the rear wheels are mounted, a jack shaft supported by and extending transversely of the frame in the rear of the axle, motion transmitting means between the jack shaft and the rear wheels, an engine mounted on the forward part of the frame, a propeller shaft, means connecting the front end of the propeller shaft and the engine shaft, the propeller shaft extending lengthwise of the frame, and under the axle to the rear thereof, and gearing between the rear end of the propeller shaft and the jack shaft, an implement shaft extending lengthwise of the frame and supported thereby, the implement shaft being substantially parallel to and spaced apart from the propeller shaft, and extending from the jack shaft forwardly under the rear axle, gearing between the jack shaft and the implement shaft, and an implement member actuated by said shaft, and connections between the implement member and the implement shaft.

2. In a motor implement, the combination of a frame, front and rear supporting wheels, an axle extending transversely of the rear portion of the frame on which the rear wheels are mounted, a jack shaft supported by the frame in the rear of the axle, and motion transmitting means between the jack shaft and the rear wheels, an engine mounted on the forward portion of the frame, and having its shaft extending lengthwise of the frame, a propeller shaft extending lengthwise of the frame and arranged at a lower level than the engine shaft, gearing between the engine and propeller shaft, the propeller shaft extending under and to the rear of the axle, an implement shaft extending lengthwise of the frame and spaced apart from the propeller shaft, the implement shaft extending under the rear axle to the rear thereof, gearing between the propeller shaft and the jack shaft, gearing between the jack shaft and the implement shaft, the implement shaft inclining downwardly and forwardly, a movable implement member carried by the frame at one side thereof, and connections between the front end of the implement shaft and the implement member, the frame having transverse braces extending along the axle and the jack shaft, and lengthwise braces extending along the propeller shaft and the implement shaft, the lengthwise braces being connected at their rear ends to the transverse brace extending along the rear axle, and brace means between the brace extending along the jack shaft and the brace extending along the axle, said brace means forming housings for said gearing connecting the jack shaft and the propeller and implement shafts.

3. In a motor implement, the combination of a frame in the general form of a right angle triangle in plan view, a steering wheel mounted at the front apex end of the frame, rear wheels mounted at the opposite ends of the base of the triangle, an axle extending transversely of the base of the triangle on which the rear wheels are mounted, a jack shaft extending transversely of the frame in the rear of the axle, motion transmitting means between the jack shaft and the rear wheels, an engine mounted on the forward part of the frame with its shaft substantially parallel to the altitude side of the triangle, the front end of said shaft being located near the hypotenuse side of the triangle, a propeller shaft extending lengthwise of the altitude side of the triangle, and being connected at its front end to the engine shaft, the rear end of the propeller shaft extending under the axle, an implement shaft extending lengthwise of the frame parallel to the propeller shaft in plan view, and located on the hypotenuse side of the triangle, the implement shaft extending downwardly and forwardly, and its rear end extending under the axle, gearing between the propeller shaft and the jack shaft, gearing between the jack shaft and the implement shaft, an implement including a movable member, and connections between the movable member and the front end of the implement shaft.

4. In a motor implement, the combination of a frame in the general form of a right angle triangle in plan view, a steering wheel mounted at the front apex end of the frame, rear wheels mounted at the opposite ends of the base of the triangle, an axle extending transversely of the base of the triangle on which the rear wheels are mounted, a jack shaft extending transversely of the frame in the rear of the axle, an engine mounted on the forward part of the frame with its shaft substantially parallel to the altitude side of the triangle, the front end of said shaft being located near the hypotenuse side of the triangle, a propeller shaft extending lengthwise of the altitude side of the triangle, means connecting the front end of the propeller shaft to the engine shaft, the rear end of the propeller shaft extending under the axle, an implement shaft extending lengthwise of the frame parallel to the propeller shaft and located on the hypotenuse side of the triangle, the implement shaft extending downwardly and forwardly, and its rear end extending under the axle, gearing between the propeller shaft and the jack shaft, gearing between the jack shaft and the implement shaft, an implement including a movable member, connections between the movable member and the front end of the implement shaft, the wheel on the hypotenuse side of the triangle being fixed to said axle to rotate therewith, and the rear wheel on the altitude side being rotatable about the axle, a differential gearing including side gears fixed respectively to the axle and to the rear wheel on the altitude side of the frame, and motion transmitting means between the jack shaft and the differential gearing.

5. In a motor implement, the combination of a frame in the general form of a right angle triangle in plan view, a steering wheel mounted at the front apex end of the frame, rear wheels mounted at the opposite ends of the base of the triangle, an axle extending transversely of the base of the triangle on which the rear wheels are mounted, a jack shaft extending transversely of the frame in the rear of the axle, an engine mounted on the forward part of the frame with its shaft substantially parallel to the altitude side of the triangle, a propeller shaft extending lengthwise of the altitude side of the triangle, and being connected at its front end to the engine transmission shaft, the rear end of the propeller shaft extending under the axle, an implement shaft extending lengthwise of the frame parallel to the propeller shaft in plan view, and located on the hypotenuse side of the triangle, the implement shaft extending downwardly and forwardly, and its rear end extending under the axle, gearing between the propeller shaft and the jack shaft, gearing between the jack shaft and the implement shaft, an implement including a movable member, and connections between the movable member and the front end of the implement shaft, the rear wheel on the hypotenuse side of the triangle being fixed to said axle to rotate therewith, and the rear wheel on the altitude side being rotatable about the axle, a differential gearing including side gears fixed respectively to the axle and to the rear wheel on the altitude side of the frame, a brake including a member mounted on said rear wheel on the altitude side of the triangle, said brake being located near the differential, and gearing between one end of the jack shaft and the differential gearing.

6. In a motor implement, the combination of a frame in the general form of a right angle triangle in plan view, a steering wheel mounted at the front apex end of the frame, rear wheels mounted at the opposite ends of the base of the triangle, an axle extending transversely of the base of the triangle on which the rear wheels are mounted, a jack shaft extending transversely of the frame in the rear of the axle, motion transmitting means between the jack shaft and the rear wheels, an engine mounted on the forward part of the frame with its shaft substantially parallel to the altitude side of the triangle, the front end of said shaft being located near the hypotenuse side of the triangle, a propeller shaft extending lengthwise of the altitude side of the triangle, means connecting the front end of the propeller shaft and the engine shaft, the rear end of the propeller shaft extending under the axle, an implement shaft extending lengthwise of the frame parallel to the propeller shaft in plan view, and located on the hypotenuse side of the triangle, the implement shaft extending downwardly and forwardly, and its rear end extending under the axle, gearing between the propeller shaft and the jack shaft, gearing between the jack shaft and the implement shaft, an implement including a movable member, and connections between the movable member and the front end of the implement shaft, the frame also comprising transverse braces extending along the axle, and the jack shaft, lengthwise braces extending along the propeller shaft and the implement shaft, and connected at their rear ends to the transverse brace along the axle, means for securing the front end of the lengthwise braces to the frame, and brace means connecting the two transverse braces, said brace means forming housings for said gearing.

7. In a motor implement, the combination of a frame in the general form of a right angle triangle in plan view, a steering wheel mounted at the front apex end of the frame, rear wheels mounted at the opposite ends of the base of the triangle, an axle extending transversely of the base of the triangle on which the rear wheels are mounted, a jack shaft extending transversely of the frame in the rear of the axle, an engine mounted on the forward part of the frame with its shaft substantially parallel to the altitude side of the triangle, the front end of said shaft being located near the hypotenuse side of the triangle, a propeller shaft extending lengthwise of the altitude side of the triangle, and being connected at its front end to the engine transmission shaft, the rear end of the propeller shaft extending under the axle, an implement shaft extending lengthwise of the frame parallel to the propeller shaft in plan view, and located on the hypotenuse side of the triangle, the implement shaft extending downwardly and forwardly, and its rear end extending under the axle, gearing between the propeller shaft and the jack shaft, gearing between the jack shaft and the implement shaft, an implement including a movable member, and connections between the movable member and the front end of the implement shaft, the rear wheel on the hypotenuse side of the triangle being fixed to said axle to rotate therewith, and the rear wheel on the altitude side being rotatable about the axle, a differential gearing including side gears fixed respectively to the axle and to the rear wheel on the altitude side of the frame, a pinion carrier, and an equalizing pinion carried thereby and meshing with the side gears, and a brake including a member mounted on said rear wheel on the altitude side of the triangle adjacent the differential gearing, gearing between the jack shaft and the carrier, the frame also including transverse tubular braces around the axle and the jack shaft, lengthwise tubular braces around the propeller shaft and the implement shaft, and fixed at their rear ends to the transverse brace around the axle, and housings enclosing the gearing between the jack shaft and the propeller and implement shafts, and serving as bracing means between the transverse braces.

8. In a motor implement, the combination of a frame in the general form of a right angle triangle in plan view, a steering wheel mounted at the front apex end of the frame, rear wheels mounted at the opposite ends of the base of the triangle, an axle extending transversely of the base of the triangle on which the rear wheels are mounted, a jack shaft extending transversely of the frame in the rear of the axle, an engine mounted on the forward part of the frame with its shaft substantially parallel to the altitude side of the triangle, the front end of said shaft being located near the hypotenuse side of the triangle, a propeller shaft extending lengthwise of the altitude side of the triangle, and being connected at its front end to the engine transmission shaft, the rear end of the propeller shaft extending under the axle, an implement shaft extending lengthwise of the frame parallel to the propeller shaft in plan view, and located on the hypotenuse side of the triangle, the implement shaft extending downwardly and forwardly, and its rear end extending under the axle, gearing between the propeller shaft and the jack shaft, gearing between the jack shaft and the implement shaft, an implement extending laterally from the altitude side of the frame and including a movable member, and connections between the movable member and the front end of the implement shaft, the rear wheel on the hypotenuse side of the triangle being fixed to said axle to rotate therewith, and the rear wheel on the altitude side being rotatable about the axle, a differential gearing including side gears fixed respectively to the axle and to the rear wheel on the altitude side of the frame, a pinion carrier, and an equalizing pinion carried thereby and meshing with the side gears, and a brake including a member mounted on said rear wheel on the altitude side of the triangle adjacent the differential gearing, gearing between the jack shaft and the carrier, the frame also including transverse tubular braces around the axle and the jack shaft, lengthwise tubular braces around the propeller shaft and the implement shaft, and fixed at their rear ends to the transverse brace around the axle, and housings enclosing the gearing between the jack shaft and the propeller and implement shafts, and serving as bracing means between the transverse braces.

9. A frame for motor agricultural machines comprising side sills, transverse tubular frame members connecting the side sills, and lengthwise tubular frame members connected to the transverse frame members and means connecting said lengthwise tubular members to the sills, wheel spindles mounted in one of the transverse frame members, a driving axle mounted in the other of the transverse frame members, a drive shaft mounted in one of the lengthwise frame members, and motion transmitting connections between the rear end thereof and the driving axle, a shaft journalled in the other lengthwise tubular frame member, motion transmitting means between the same and the driving axle, and motion transmitting mechanism also connected to the front end of the last shaft, wheels for supporting the frame, two of said wheels being mounted on said spindles, and motion transmitting means between the driving axle and the wheels.

10. A frame for motor agricultural machines comprising side sills and transverse members, one side sill being arranged inclined relatively to the other, whereby the frame is in the general form of a right triangle, an intermediately located transverse bar between the sills, and a lengthwise bar connected with the intermediate transverse bar and extending forwardly from said transverse bar substantially parallel to one side sill and connected at its front end to the inclined sill, a motor supported on the forward portion of the frame toward the apex thereof between the last mentioned bar and the front portions of the parallel side sill, the engine being arranged with its shaft extending lengthwise of the frame, wheels for supporting the frame including two wheels at the rear end of the frame, and motion transmitting means between the engine shaft and the rear wheels including a propeller shaft extending lengthwise of the frame and connected at its front end to the engine shaft, and motion transmitting connections between the rear end of the propeller shaft and the wheels.

11. A frame for agricultural machines comprising side sills, transverse tubular frame members connecting the rear portions of the side sills, one of the side sills being inclined relatively to the other, whereby the frame is substantially in the form of a right triangle, a transverse bar extending between the sills intermediately of the ends thereof, a lengthwise bar extending forwardly from the transverse bar to the forward portion of the inclined bar, lengthwise tubular frame members supported at their front ends by said transverse bar and at the rear ends by one of the tubular bars, wheel spindles mounted in one of the transverse tubular bars, a driving axle mounted in the other of the transverse tubular bars, shafts mounted in the lengthwise tubular bars, motion transmitting mechanism between the rear ends of the shafts and the driving axle, an engine mounted on the forward portion of the frame, one of said lengthwise shafts being connected at its front end to the engine, and the other having motion transmitting means at its front end, drive wheels mounted on the wheel spindles, a steering wheel mounted at the front of the frame and motion transmitting means between the driving axle and the drive wheels.

12. A frame for motor agricultural machines comprising side sills converging toward their front ends, means connecting the front ends of the side sills together and supporting the fork of a steering wheel, a transverse tubular member connecting the rear ends of the sills and firmly secured thereto for receiving the axle of the rear supporting wheels of the machine, a second transverse tubular member in the rear of the former and secured at its ends to the side sills, a drive shaft mounted in the second tubular member for driving the rear wheels of the machine and the implement mechanism of the machine, tubular arms extending forwardly from the first mentioned transverse member, means for securing the front ends of said arms to the sills, said tubular arms receiving respectively an engine actuated shaft connected to the shaft in the second tubular member and an implement driving shaft connected to said shaft in the second tubular member, substantially as described.

13. In an agricultural machine, a support comprising side sills, transverse frame members connecting the side sills at their rear ends, lengthwise frame members connected to and extending forward from the transverse members and means connecting the front ends of said lengthwise members to the sills, wheel spindles mounted in one of the transverse members and extending lengthwise thereof, a drive shaft supported by one of the lengthwise members and extending lengthwise thereof, a driving axle supported by the other of the transverse members and extending lengthwise thereof, motion transmitting connections between the rear end of the drive shaft and the driving axle, a shaft supported by the other lengthwise member, motion transmitting means between the rear end of the same and the driving axle, motion transmitting mechanism connected to the front end of the last shaft, wheels for supporting the frame, two of said wheels being mounted on said spindles, and motion transmitting means between the drive axle and said wheels.

14. A motor agricultural machine comprising a frame having side sills converging toward their front ends, means connecting the front ends of the side sills together and supporting the fork of the steering wheel, a transverse frame member connecting the rear ends of the sills and firmly secured thereto, wheel spindles supported by said transverse frame member at the ends thereof and extending lengthwise thereof, on which spindles supporting wheels are mounted, a second transverse frame member in the rear of the former and secured at its ends to the side sills, a driving axle supported by the second transverse frame member and extending lengthwise thereof, motion transmitting means between the driving axle and the rear wheels, rigid arms extending forwardly from the first transverse member, means for securing the front ends of said arms to the sills, an engine mounted on the forward part of the frame, a propeller shaft supported by one of the lengthwise arms and extending along the same, and connected at its front end to the engine shaft, and motion transmitting means between the rear end of the propeller shaft and the driving axle, an implement shaft supported by the other rigid arm and extending lengthwise thereof, motion transmitting means between the rear end of the implement shaft and the driving axle, and motion transmitting mechanism for actuating the implement connected to the front end of the implement shaft.

15. In a motor driven machine, a frame, a steering wheel at the front end of the frame, a shaft extending transversely of the rear end of the frame and journalled in bearings provided in the frame, a driving wheel mounted on one end of the shaft to rotate therewith, a second driving wheel rotatably mounted on the other end of the shaft and capable of movement about the shaft, the wheels being arranged near the vertices of the angles of the right triangle formation with the second wheel which is rotatably mounted on the shaft in the rear of the steering wheel, a cutting implement extending laterally in front of the second driving wheel, a motor, motion transmitting means between the motor and the drive wheels comprising a second shaft journalled in the frame in the rear of the former shaft, a differential gearing including side gears mounted respectively on the first shaft and on the second driving wheel, a pinion carrier, and equalizing pinions mounted on the carrier and meshing with the side gears and driving connections between the second shaft and the pinion carrier, a third shaft driven by the motor and extending lengthwise of the frame, gearing between the third shaft and the second shaft, a fourth shaft extending lengthwise of the frame, connections between the fourth shaft and the implement, and gearing between the second shaft and the fourth shaft, a brake drum associated with the second driving wheel, a brake band coacting with said drum and means for operating the band.

In testimony whereof, I have hereunto signed my name, at Syracuse, in the county of Onondaga, and State of New York, this 22nd day of October, 1930.

CHARLES S. BROWN.